US012008041B2

(12) United States Patent
Jiang et al.

(10) Patent No.: US 12,008,041 B2
(45) Date of Patent: Jun. 11, 2024

(54) SHARED CACHE FOR MULTIPLE INDEX SERVICES IN NONRELATIONAL DATABASES

(71) Applicant: International Business Machines Corporation, Armonk, NY (US)

(72) Inventors: Peng Hui Jiang, Beijing (CN); Xing Xing Shen, Beijing (CN); Guang Han Sui, Beijing (CN); Jun Su, Beijing (CN); Hai Ling Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 17/475,601

(22) Filed: Sep. 15, 2021

(65) Prior Publication Data

US 2023/0081324 A1    Mar. 16, 2023

(51) Int. Cl.
*G06F 16/903*   (2019.01)
*G06F 12/0891*   (2016.01)
*G06F 16/2455*   (2019.01)
*G06F 16/901*   (2019.01)

(52) U.S. Cl.
CPC ...... *G06F 16/9027* (2019.01); *G06F 12/0891* (2013.01); *G06F 16/24552* (2019.01); *G06F 16/90335* (2019.01)

(58) Field of Classification Search
CPC ............ G06F 16/9027; G06F 12/0891; G06F 16/24552; G06F 16/90335; G06F 16/31; G06F 16/328; G06F 12/0842; G06F 12/121; G06F 2212/1024; G06F 2212/154; G06F 2212/163; G06F 16/903; G06F 16/9035
See application file for complete search history.

(56) References Cited

U.S. PATENT DOCUMENTS

| | | | |
|---|---|---|---|
| 7,558,920 B2 | 7/2009 | Mattina et al. | |
| 8,095,618 B2 | 1/2012 | Lewis et al. | |
| 9,251,003 B1 * | 2/2016 | Gupta | G06F 11/1438 |
| 11,061,548 B1 * | 7/2021 | Catakli | H04L 67/75 |

(Continued)

FOREIGN PATENT DOCUMENTS

CN        1049750 C      2/2000

OTHER PUBLICATIONS

Zongshui, Xiao, et al. "Global Index Oriented Non-Shard Key for Multi-tenant Database." 2015 IEEE International Conference on Computer and Information Technology; Ubiquitous Computing and Communications; Dependable, Autonomic and Secure Computing; Pervasive Intelligence and Computing. IEEE, 2015. (Year: 2015).*

(Continued)

*Primary Examiner* — Vaishali Shah
(74) *Attorney, Agent, or Firm* — CANTOR COLBURN LLP; Teddi Maranzano

(57) ABSTRACT

A computer-implemented method includes receiving, by a processing unit, from a first tenant, a query to retrieve data from a nonrelational database system. The method further includes determining, by the processing unit, that an index associated with the query is cached in a shared index cache, wherein the shared index cache stores indexes for a plurality of tenants. The method further includes retrieving, by the processing unit, a result of the query based on the index in the shared index cache. The method further includes outputting, by the processing unit, the result of the query.

17 Claims, 8 Drawing Sheets

(56) References Cited

U.S. PATENT DOCUMENTS

| | | | |
|---|---|---|---|
| 11,222,066 B1* | 1/2022 | Batsakis | G06F 3/0652 |
| 11,861,767 B1* | 1/2024 | Kong | G06F 16/24568 |
| 2006/0004963 A1 | 1/2006 | Mattina et al. | |
| 2010/0174939 A1 | 7/2010 | Vexler | |
| 2011/0265083 A1* | 10/2011 | Davis | G06F 12/0866 |
| | | | 718/1 |
| 2012/0159080 A1* | 6/2012 | Donley | G06F 12/0895 |
| | | | 711/141 |
| 2015/0222704 A1* | 8/2015 | Kipp | G06F 3/0659 |
| | | | 709/213 |
| 2015/0278278 A1* | 10/2015 | Keim | G06F 16/2453 |
| | | | 707/741 |
| 2021/0263919 A1* | 8/2021 | Ginzburg | G06F 16/2455 |
| 2021/0328789 A1* | 10/2021 | Hosur | H04L 9/0894 |

OTHER PUBLICATIONS

Zou, Lida, Qingzhong Li, and Lanju Kong. "Multi-tenant Main Memory Index Tree with Shared Structure." TELKOMNIKA (Telecommunication Computing Electronics and Control) 14.2A (2016): 77-84. (Year: 2016).*

Ajredini, "Redis Cashe distributed in-memory with NoSQL Databases," ResearchGate.com, Retrieved from the Internet: <URL: https://www.researchgate.net/publication/338712476>, Jan. 2020, 7 pages.

Anonymous, "Method and System for Dynamic Management of Cache Eviction in Multitenant Environments," IP.com Prior Art Database Technical Disclosure, IP.com No. IPCOM000239143D, Oct. 16, 2014, 4 pages.

Jaleel et al., "Adaptive insertion policies for managing shared caches," 17th International Conference on Parallel Architectures and Compilation Techniques, Oct. 25-29, 2008, 13 pages.

Kim et al., "A Hybrid Cache Architecture for Meeting Per-Tenant Performance Goals in a Private Cloud," Cornell University, arXiv. org, Retrieved from the Internet: <URL: https://arxiv.org/abs/1906.01260>, Jun. 4, 2019, 11 pages.

Seyri et al., "Dynamically Sharing Memory between Memcached Tenants using Tingo," CoNEXT '19 Companion: Proceedings of the 15th International Conference on emerging Networking EXperiments and Technologies, Dec. 2019, pp. 40-42.

* cited by examiner

SHARED CACHE FOR MULTIPLE INDEX SERVICES IN NONRELATIONAL DATABASES

BACKGROUND

The present invention generally relates to computer technology and, more specifically, creating and using shared cache for multiple index services in nonrelational databases.

Nonrelational databases, also referred to as "NoSQL" databases are used in computer program products because they can handle huge volumes (Terabytes, Petabytes, or more) of rapidly changing, unstructured data in different ways than a relational (SQL=structured query language) database with rows and tables. Such nonrelational databases have grown in popularity to enable computer programs to handle large volume of data with a variety of data generated being generated from different sources, such as from cloud, mobile, social media, big data, and other such technologies. Nonrelational databases enable developers of computer programs to create database systems to store new information and make it readily available for search, consolidation, and analysis.

SUMMARY

According to one or more embodiments of the present invention, a computer-implemented method includes receiving, by a processing unit, from a first tenant, a query to retrieve data from a nonrelational database system. The method further includes determining, by the processing unit, that an index associated with the query is cached in a shared index cache, wherein the shared index cache stores indexes for a plurality of tenants. The method further includes retrieving, by the processing unit, a result of the query based on the index in the shared index cache. The method further includes outputting, by the processing unit, the result of the query.

According to one or more embodiments of the present invention, a system includes an index storage comprising a plurality of indexes for a nonrelational database system. The system further includes one or more processors coupled with the index storage, the one or more processors configured to perform a method. The method includes receiving, by a processing unit, from a first tenant, a query to retrieve data from a nonrelational database system. The method further includes determining, by the processing unit, that an index associated with the query is cached in a shared index cache, wherein the shared index cache stores indexes for a plurality of tenants. The method further includes retrieving, by the processing unit, a result of the query based on the index in the shared index cache. The method further includes outputting, by the processing unit, the result of the query.

According to one or more embodiments of the present invention, a computer program product includes a computer-readable memory that has computer-executable instructions stored thereupon. The computer-executable instructions when executed by a processor cause the processor to perform a method. The method includes receiving, by a processing unit, from a first tenant, a query to retrieve data from a nonrelational database system. The method further includes determining, by the processing unit, that an index associated with the query is cached in a shared index cache, wherein the shared index cache stores indexes for a plurality of tenants. The method further includes retrieving, by the processing unit, a result of the query based on the index in the shared index cache. The method further includes outputting, by the processing unit, the result of the query.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
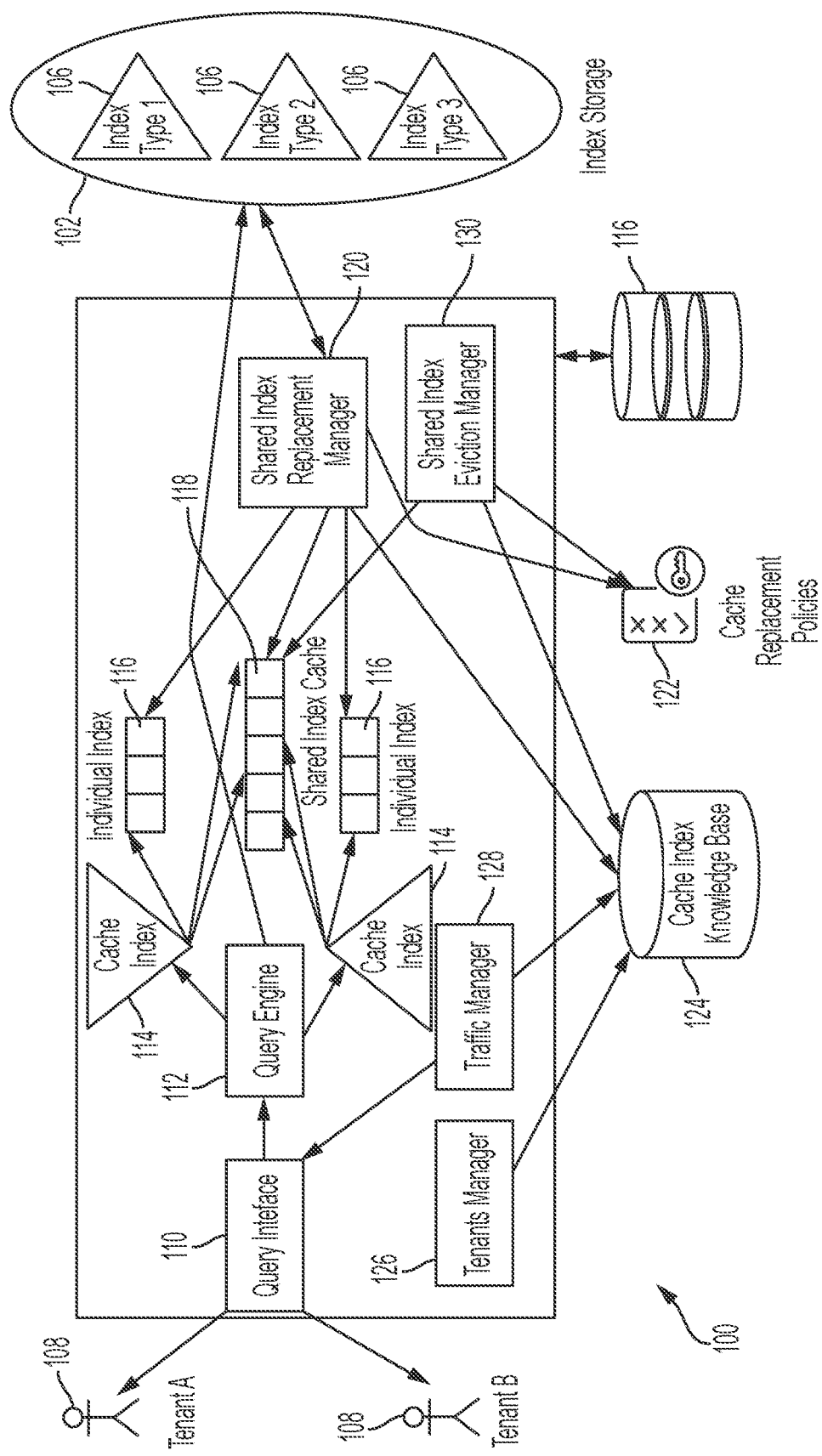
FIG. 1 depicts a nonrelational database system according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted, or modified. Also, the term "coupled", and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Technical solutions are described herein to improve the efficiency of database systems by creating and using shared cache for multiple index services in nonrelational databases (i.e., NoSQL databases). Nonrelational databases are widely used by users (and organizations) to develop products (combination of hardware and software) in the technical fields of mobile, web, Internet of Things (IoT), gaming, medical records, e-commerce, media streaming, data analytics, finance, etc. Such products require flexible, scalable, high-performance, and highly functional databases. Relational database systems typically use a predefined structure, which can limit flexibility and adaptability of storing data as the data sources, the data types, and other factors evolve. For example, types of devices used for data generation have changed rapidly from desktop computers, to laptop computers, to mobile devices and wearable devices. Further, the storage of data has also changed, such as from local storage of data to cloud storage for streaming, and real-time collaboration. Hence, nonrelational databases, which facilitate scale-out data stores, have gained attraction to support high-traffic Internet applications, such as search engines, media websites, e-commerce, referral websites, etc.

Examples of nonrelational databases include, but are not limited to: DYNAMO®, BIGTABLE®, PNUTS®, CASSANDRA®, HBASE®, etc. Nonrelational databases are particularly attractive for products that perform operations that need low latency guarantees as data stored in the nonrelational databases scale to large sizes, e.g., 1 Petabyte, etc. Maintaining such guaranteed low latency as the data scales out is technical challenging.

Indexing and disk seek time are among the factors that affect the latency of data retrieval from a nonrelational database. A variety of different index mechanisms are used in nonrelational databases (B-Tree indexing, T-Tree indexing, O2-Tree indexing, map-reduce view indexing, full text indexing, geospatial indexing, etc.). Different indexing provide better (or worse) latency based on the type of data being retrieved (or stored) from the nonrelational database. Depending on the indexing mechanism used, the time required for the physical storage device (e.g., hard disk drive (HDD)) to retrieve the data can vary. For example, traversing a four-level B-Tree index can take four times the latency compared to traversing a single-level B-Tree.

Therefore, to lower the latency, database systems cache the indexes and/or other frequently accessed data. In some cases, database systems may entirely cache frequently used indexes so that an index lookup does not trigger a single disk seek. A variety of caching techniques are used to improve search efficiency, and least recently used (LRU) is one of the most popular caching algorithms to decide how to discard old entries (e.g., indexes) and make room for new ones in the cache.

However, the variety of caching algorithms in conjunction with the variety of indexing techniques can cause duplication. Such duplication is a technical challenge for cache memories, which are relatively much smaller compared to the storage space and data stored in such storages. The duplication is even more pronounced in the case of data storage systems that support multi-tenant databases (i.e., different databases from different tenants (i.e., organizations, developers, computer programs, etc.)). Different indexing techniques have their own cache management without any associated operation (filter cache, query result cache, document cache, etc.). Alternatively, or in addition, different tenants have their cache management without any associated sharing. Such duplication causes multiple indexes to exist in memory (including cache memory) that represent the same information.

Embodiments of the present invention address such technical challenges that are rooted in computing technology, particularly database systems, and more specifically nonrelational database systems. Embodiments of the present invention facilitate optimizing the cache of nonrelational database systems that include different indexing to lower the data retrieval latency. Accordingly, embodiments of the present invention provide improvements to computing technology, particularly nonrelational database systems. Embodiments of the present invention provide practical application to a technical challenge in nonrelational database systems.

Embodiments of the present invention address the technical challenges described herein by creating and use shared LRU caches for multiple index services, and includes capturing a pattern of filters, query results, and documents from multiple index services. Further, embodiments of the present invention build the conversion relationship of filter, query result and document from multiple index services. Further, embodiments of the present invention combine the cache item for filter, query result, document from multiple index services. Further, embodiments of the present invention adjust the shared cache items according to different eviction policies. Further, embodiments of the present invention accept the query result, and search matched filter pattern or convertible pattern. Further, embodiments of the present invention search shared query result and document in order to get result directly from memory instead of search from persistence.

Embodiments of the present invention, accordingly, facilitate the caches from multiple index services to be shared. Multiple types of cache can be applied to support search efficiency. Further, multiple eviction policies can be applied when using one or more embodiments of the present invention.

FIG. 1 depicts a nonrelational database system 100 according to one or more embodiments of the present invention. The nonrelational database system 100 includes an index storage 102 that stores a variety of indexes that are used to access the stored data 104 in response to a query from a tenant 108.

The index storage 102 can include a variety of different indexes 106 as noted herein. For example, the index storage 102 can include a B-Tree index, a map-reduce view index, a full text index, a geo-spatial index, a graph index, etc. The different indexes 106 have their respective properties/characteristics. For example, some indexes 106 use unique indexes, some are partial indexes, some are sparse indexes, some are time-to-live (TTL) indexes, etc. Further, each index 106 can have its own set of limitations. For example, some indexes 106 have range limitations, some have random access memory (RAM) usage limitations, some have query limitations, some have indexed key limits, etc. The different indexes 106 can refer to the same (common) data in the data storage 104.

Figure 2:
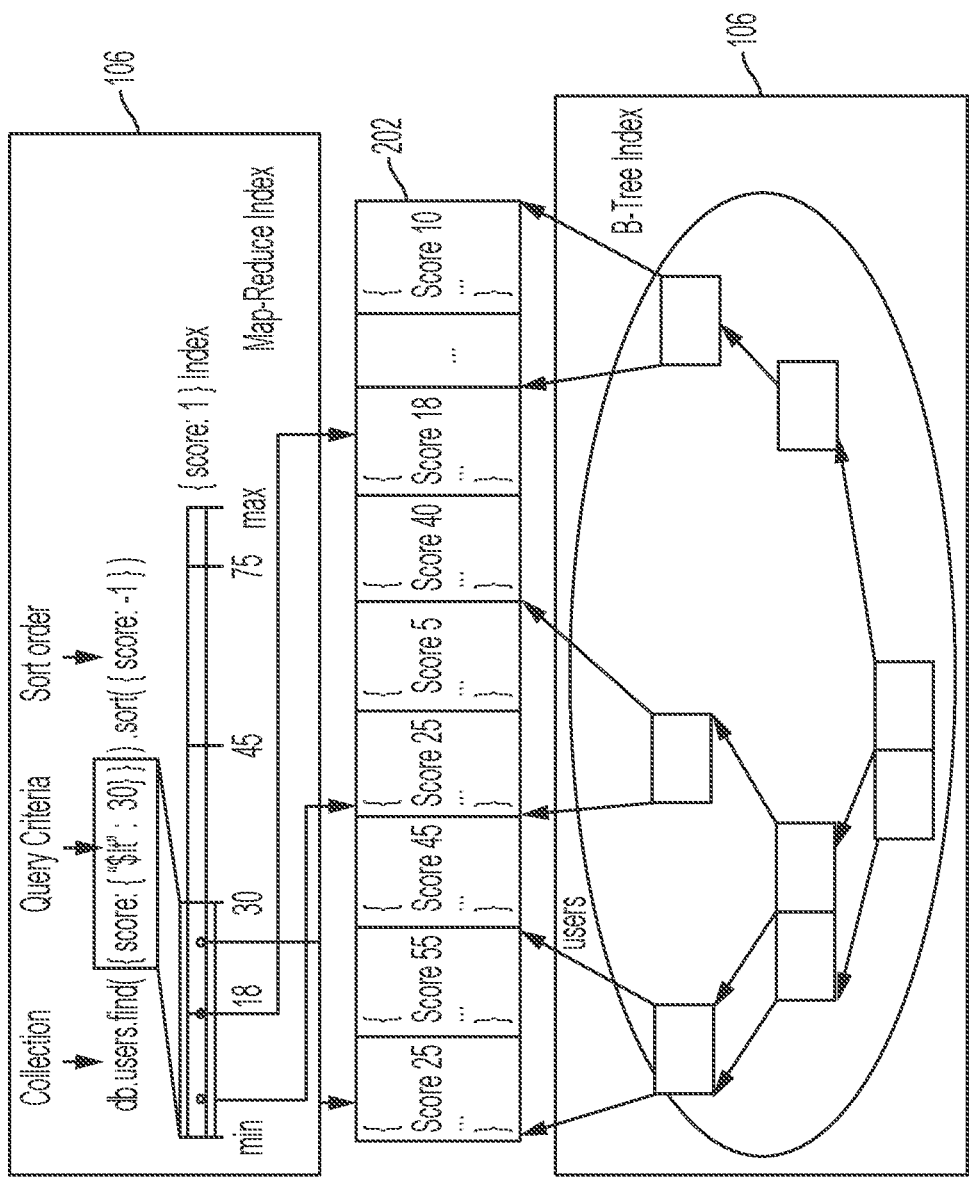
FIG. 2 depicts an example of multiple indexes referring to the same data according to one or more embodiments of the present invention.

FIG. 2 depicts an example of multiple indexes referring to the same data according to one or more embodiments of the present invention. The indexes 106 B-tree index and map-reduce index are shown, both referring to the same data 202. The data 202 is stored in the data storage 104. It is understood that other indexes 106 can be used in other examples, and that such other indexes 106 can also refer to the same data 202.

Referring back to FIG. 1, the nonrelational database system 100 further includes a query interface 110 that receives input from one or more tenants 108. The query interface 110 can receive the queries in various formats, such as textual query, audio query, visual query, graphical query, etc. The tenants 108 can be users of the nonrelational database system 100, for example, developers, consumers, data-creators, etc. The tenants 108 can input a query with one or more parameters to retrieve, add, modify, delete, etc.

the data stored in the data storage 104, which is indexed using the one or more indexes 106.

The query interface 110 forwards the query from the one or more tenants 108 to a query engine 112. The query engine 112 facilitates retrieval of the data pertaining to the query, which is further presented to the tenants 108 as output/result by the query interface 110.

The query engine 112 first checks one or more cache indexes 114 to find if the result of the query is cached. Each tenant 108 can have a respective cache index 114. A cache index 114 includes an individual index cache 116, which is respective to each tenant 108. Alternatively, or in addition, the individual index cache 116 is specific to a particular index 106. Each cache index 114 further includes a reference to a shared index cache 118. The shared index cache 118, as the name suggests, is shared among all the tenants 108. The shared index cache 118 caches a copy of one (or more) of the indexes 106 from the index storage 102. The shared index cache 118 can store different indexes 106, which can be for different tenants 108.

If the cache index 114 is penetrated (the data to be searched is not within the cache index 114), the query engine 112 searches against the indexes 106 in the index storage 102.

The nonrelational database system 100 further includes a shared index replacement manager 120 that is responsible to determine which index 106 should be used as a replacement to one of the indexes stored in the cache index 114. The shared index replacement manager 120 can make the determination based on cache replacement policies 122.

The cache replacement policies 122 can be preconfigured by an administrator of the nonrelational database system 100. The cache replacement policies 122, in one or more embodiments of the present invention, are algorithms used by the shared index replacement manager 120 and a shared index eviction manager 130 to determine which items are chosen to be discarded to make room for the new ones when the shared index cache 118 is full. The cache replacement policies 122 can include first in first out (FIFO), least recently used (LRU), least-frequently used (LFU), or any other such algorithm, or a combination thereof.

The cache index knowledge base 124 includes one or more query request patterns. The query request patterns facilitate the shared index replacement manager 120 to adjust the cache index 114 so that the optimal index 106 is stored in the cache index 114 to reduce the latency of data retrieval.

The shared index replacement manager 120 determines the optimal index type based on statistic data that is gathered in the cache index knowledge base 124. The statistical data is accumulated by a traffic manager 126 and a tenant manager 128. Based on the statistics, the shared index replacement manager 120 identifies the index 106 to be shared. Further, based on the cache replacement policies 122, the shared index replacement manager 120 decides whether to put the identified index 106 in the shared index cache 118.

In one or more embodiments of the present invention, a shared index eviction manager 130 is responsible of scanning the shared index cache 118 and evict an index that is not used often. The shared index eviction manager 130 determines whether an index is being used "often" based on the statistics accumulated by a traffic manager 126 and a tenant manager 128.

Figure 3:
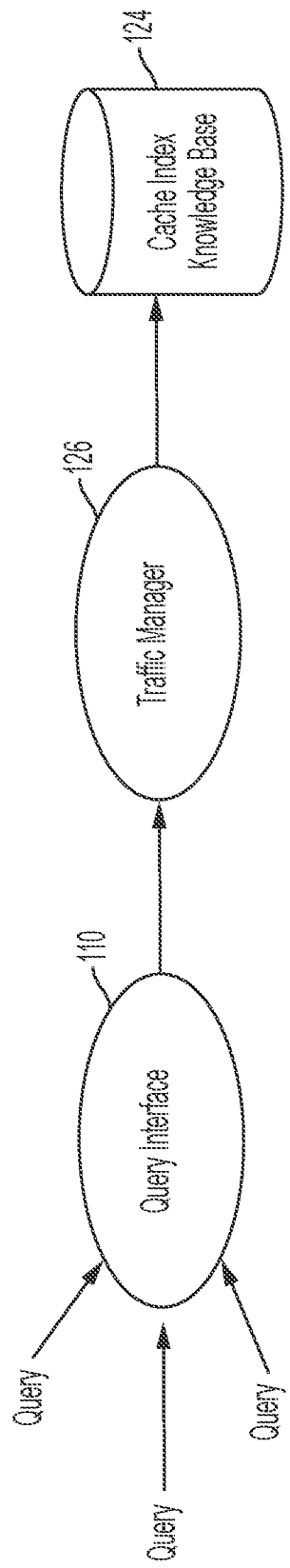
FIG. 3 depicts a block diagram of accumulating the statistics in a cache index knowledge base according to one or more embodiments of the present invention.

FIG. 3 depicts a block diagram of accumulating the statistics in the cache index knowledge base 124 according to one or more embodiments of the present invention. The traffic manager 126 monitors the traffic from query requests that are input and stores statistics to the cache index knowledge database 124. The accumulated statistics can include but is not limited to a set of query statements and its requester/tenants, and a set of indexes associated with the query.

The traffic manager 126 also stores execution context associated with the query. For example, the context can include user schema, application module name and action, list of bind values, and cursor compilation environments. Further, the traffic manager 126 stores execution statistics associated with the query, such as elapsed time, CPU time, buffer gets, disk reads, rows processed, cursor fetches, number of executions, number of complete executions, optimizer cost, command type, etc.

The index storage 102 has a higher latency for the query engine 112 to retrieve any of the indexes 106 compared to retrieving an index from the cache index 114. Thus, retrieving an index from the cache index 114 reduces the latency of obtaining a result for an input query from a tenant 108. Further, it is understood that the one or more components of the nonrelational database system 100, such as the query engine 112, the shared index replacement manager 120, the shared index eviction manager 130, etc. can be implemented as computer executable instructions in one or more embodiments of the present invention. Further, the one or more components of the nonrelational database system 100 can be combined or partitioned further in one or more embodiments of the present invention.

Reducing the latency of data retrieval is a technical challenge as noted herein. To further emphasize the technical challenge, consider an example scenario where the nonrelational database system 100 includes 500,000 databases, which can be typical in today's information-centric world. Further, consider that each database has 40 to 50 indexes 106 each, each index 106 being 1 Megabyte in size on average. Multiple queries (e.g., 25, 30, etc.) can be generated by a tenant 108 with each keypress of his/her keyboard, for example, real-time keyword searches. The queries can require operations such as table joins, etc. to be performed to obtain the relevant results. Retrieving the index to provide the result can, thus, require retrieving and processing multiple Megabytes of data. Retrieving the indexes from the index storage 102, which is generally a relative slower storage device (e.g., hard disk drive, magnetic tape, etc.) compared to a cache memory (e.g., flash memory), is therefore slower. Embodiments of the present invention, by caching the indexes 106 in the cache index 114, reduce the latency, thus, addressing the technical challenges.

Embodiments of the present invention, accordingly, provide a practical solution to a technical challenge that is rooted in computing systems, particularly nonrelational database systems. Embodiments of the present invention facilitate to create and use shared caches for multiple index types and multiple tenants. Further, Embodiments of the present invention facilitate analyzing and monitoring the data traffic and patterns from query requests and storing statistic data into the cache index knowledge database 124. Embodiments of the present invention also facilitate managing tenants and their specific indexes.

Embodiments of the present invention facilitate adjusting the shared cache items based cache replacement eviction policies. Further, the shared index is scanned to evict any inactive index. In one or more embodiments of the present invention, a query result may be obtained by performing a search against matched filter pattern or convertible pattern either from shared cache or individual index cache, or from remote index storage persistence. Based on the usage and querying, embodiments of the present invention facilitate moving indexes from remote index storage persistence to the cache, and even to shared cache to use for multiple tenants and index type.

Figure 4:
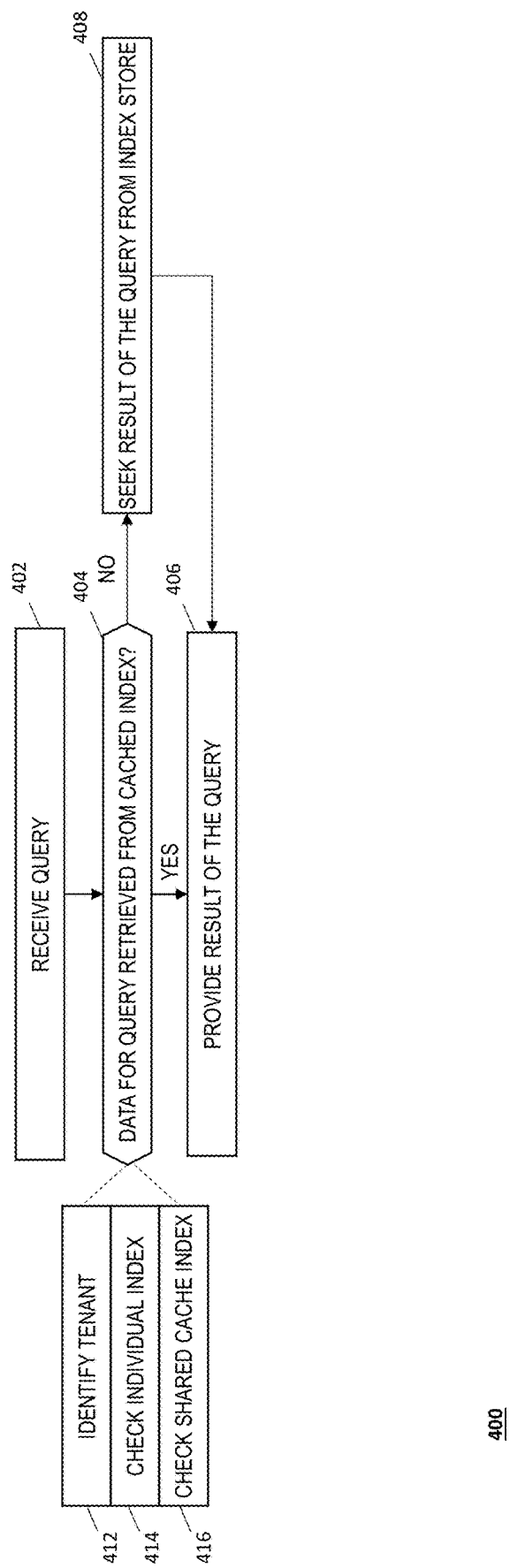
FIG. 4 depicts a flowchart of a method for using a shared cache for multiple index services in a nonrelational database system according to one or more embodiments of the present invention.

FIG. 4 depicts a flowchart of a method for using a shared cache for multiple index services in a nonrelational database system according to one or more embodiments of the present invention. The method 400 that is depicted includes receiving a query via the query interface 110, at block 402. The query engine 112 determines if the index associated with the query is in the cache index 114, at block 404.

Determining if the index is in the cached index 114 includes the query engine 112 determining the tenant 108 associated with the received query, 412. The tenant can be determined based on the data from the traffic manager 126.

At block 414, the query engine 112 further checks if the index associated with the query is in the individual index cache 116 that is associated with that tenant 108. If the index is found in the individual index cache 116, it is used to determine the result.

If the index is not found in the individual index cache 116, at block 416, the query engine 112 checks if the index is present in the shared cache index 118, which can have indexes based on queries from other tenants 108. If the index is found in the shared index cache 118, it is used to determine the result.

If the result is not found via the cache index 114 (i.e., neither the individual index cache 116 nor the shared cache index 118), the query engine finds the index from the index storage 102, at block 408.

The result is output, via the query interface 110, at block 406. The result may be found from the cache index 114 or the index storage 102.

Figure 5:
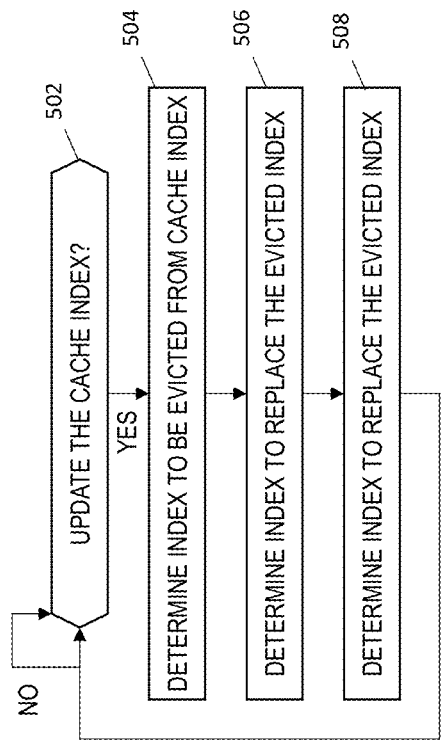
FIG. 5 depicts a flowchart of a method to update a cache index in a nonrelational database system according to one or more embodiments of the present invention.

FIG. 5 depicts a flowchart of a method to update a cache index in a nonrelational database system according to one or more embodiments of the present invention. The method 500 that is depicted is repeatedly performed in one or more embodiments of the present invention to keep the cache index 114 updated. In one or more embodiments of the present invention, the method 500 is executed at a predetermined frequency. Alternatively, or in addition, when the shared index cache 118 is full, the method 500 is executed to ensure that the optimal combination of indexes is cached in the shared index cache 118.

At block 502, the method 500 includes determining whether the shared index cache 118 is to be updated for one or more reasons as described. The method 500 can loop in this stage until an update is required. Once it is determined that an update is required, at block 504, the method includes determining the index from the shared index cache 118 that is to be evicted. The shared index eviction manager 130 determines the index to be evicted based on the cache replacement policies 122. For example, the determination may be made based on FIFO, LRU, LFU, etc., or a combination thereof.

Further, at block 506, the method 500 includes identifying the index from the index storage 102 that is to be stored in the shared index cache 118. The determination is made based on the statistic stored in the cache index knowledge base 124. In order to reduce throttling of index between the shared index cache 118 and the individual index cache 116, the shared index replacement manager computes an index-score to indicate whether an index should be added to the shared index cache 118 instead of the individual index cache 116 of a particular tenant 108. The index-score S, in one or more embodiments of the present invention, is computed as:

$$\text{Index-score} = S_1 \cdot W_1 + S_2 \cdot W_2 \ldots S_n \cdot W_n$$

Here, S represents a similarity related to a data pair, W represents a weight assigned to the data pair, N represents the number of similarities related to a data pair, $1 \leq i \leq N$. The index-score, accordingly, represents a similarity of two indexes. Here, "data pair" is the indexes to be compared, if they are similar, they are added to the shared index. There are multiple factors for similarity of two indexes, such as from same database, from same tenants, from same context, etc. The similarity S is calculated using known techniques based on such metadata, and in some cases, data associated with the data pair.

In one or more embodiments of the present invention, for each index 106 in the index storage 102, the shared index replacement manager 120 compares the index in the individual index cache 116 with the indexes 106 stored in the index storage 102. The index 106 with the lowest index-score is stored in the shared index cache 118. In other embodiments of the present invention, an index 106 with an index-score less than a predetermined threshold is identified.

The index 106 that is identified from the index storage 102 in this manner is stored in the shared index cache 118, at block 508.

Embodiments of the present invention facilitate caches from multiple index services to be shared. Further, embodiments of the present invention facilitate multiple types of cache to be applied to support search efficiency. Additionally, embodiments of the present invention can facilitate a nonrelational database system to support multiple eviction policies.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
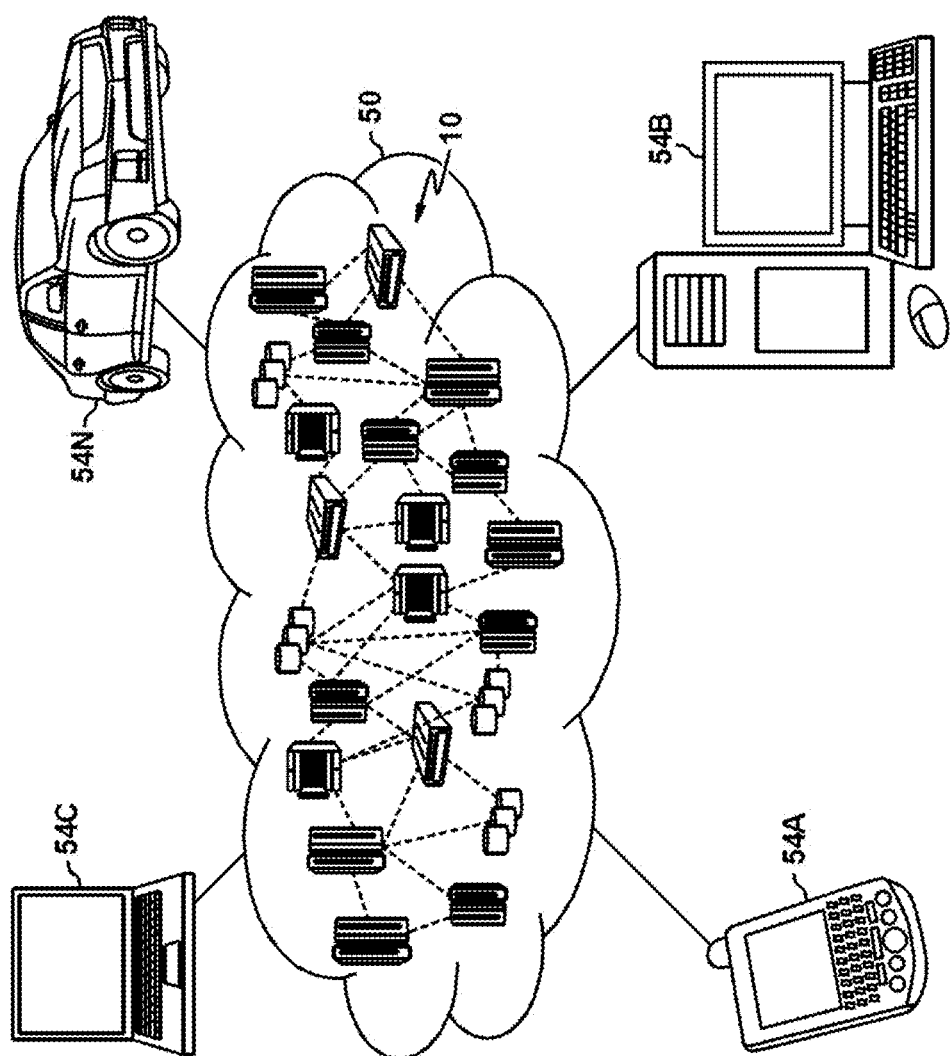
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
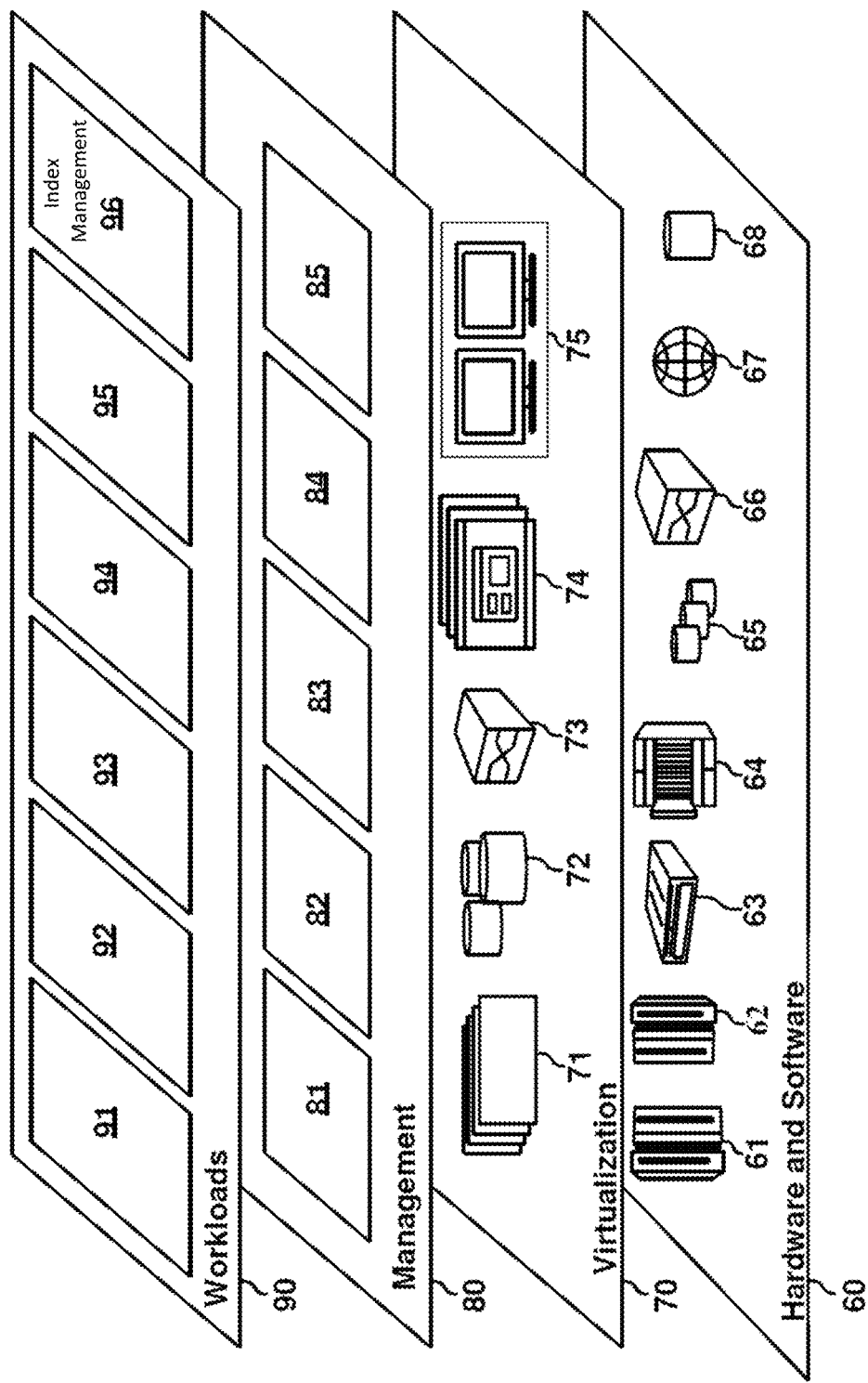
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing indexes, particularly in the shared cache index 118.

Figure 8:
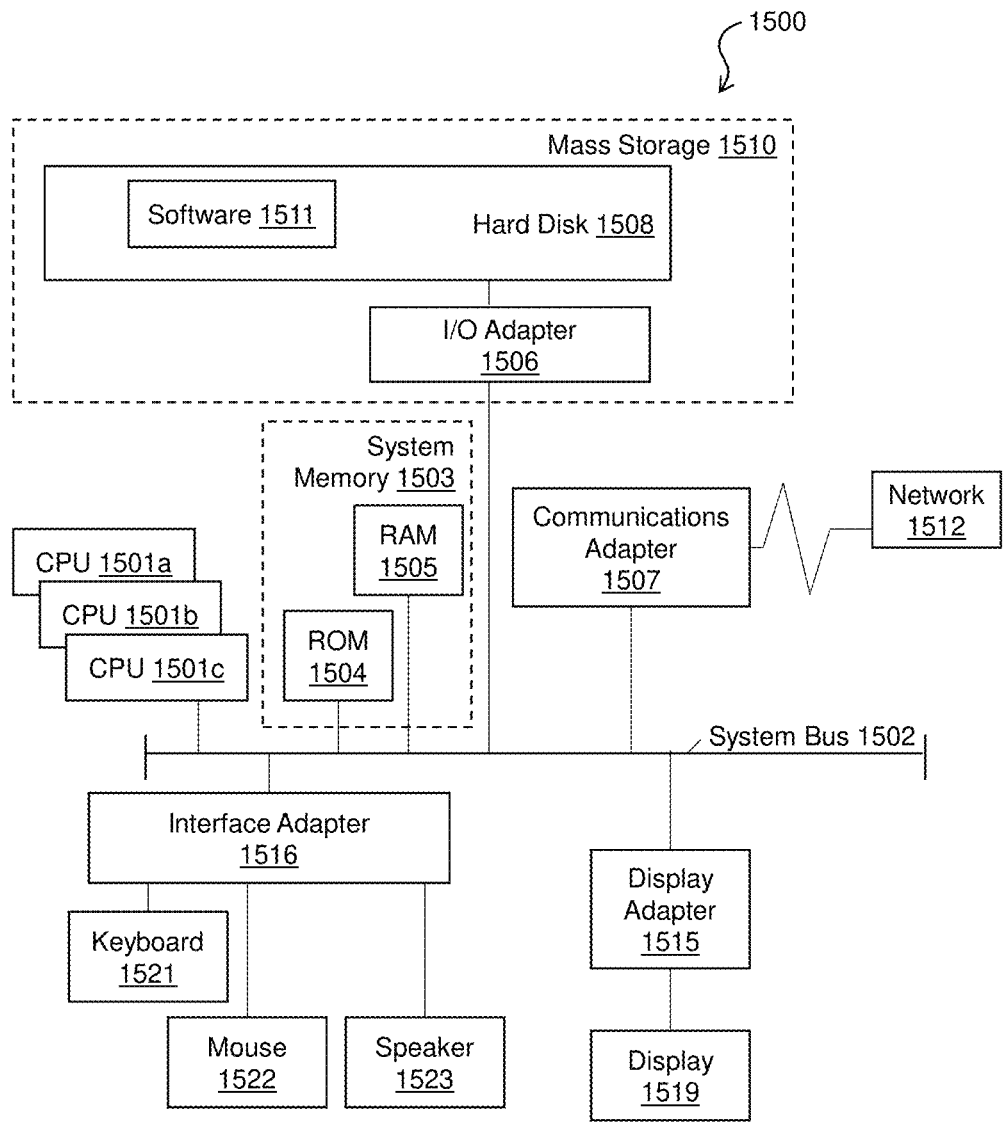
FIG. 8 depicts a computing system according to one or more embodiments of the present invention.

Turning now to FIG. 8, a computer system 1500 is generally shown in accordance with an embodiment. The computer system 1500 can be a computing system being used to operate a nonrelation database system 100. The computer system 1500 can be an electronic, computer framework comprising and/or employing any number and combination of computing devices and networks utilizing various communication technologies, as described herein. The computer system 1500 can be easily scalable, extensible, and modular, with the ability to change to different services or reconfigure some features independently of others. The computer system 1500 may be, for example, a server, desktop computer, laptop computer, tablet computer, or smartphone. In some examples, computer system 1500 may be a cloud computing node. Computer system 1500 may be described in the general context of computer system executable instructions, such as program modules, being executed by a computer system. Generally, program modules may include routines, programs, objects, components, logic, data structures, and so on that perform particular tasks or implement particular abstract data types. Computer system 1500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 1500 has one or more central processing units (CPU(s)) 1501a, 1501b, 1501c, etc. (collectively or generically referred to as processor(s) 1501). The processors 1501 can be a single-core processor, multi-core processor, computing cluster, or any number of other configurations. The processors 1501, also referred to as processing circuits, are coupled via a system bus 1502 to a system memory 1503 and various other components. The system memory 1503 can include a read only memory (ROM) 1504 and a random access memory (RAM) 1505. The ROM 1504 is coupled to the system bus 1502 and may include a basic input/output system (BIOS), which controls certain basic functions of the computer system 1500. The RAM is read-write memory coupled to the system bus 1502 for use by the processors 1501. The system memory 1503 provides temporary memory space for operations of said instructions during operation. The system memory 1503 can include random access memory (RAM), read only memory, flash memory, or any other suitable memory systems.

The computer system 1500 comprises an input/output (I/O) adapter 1506 and a communications adapter 1507 coupled to the system bus 1502. The I/O adapter 1506 may be a small computer system interface (SCSI) adapter that communicates with a hard disk 1508 and/or any other similar component. The I/O adapter 1506 and the hard disk 1508 are collectively referred to herein as a mass storage 1510.

Software 1511 for execution on the computer system 1500 may be stored in the mass storage 1510. The mass storage 1510 is an example of a tangible storage medium readable by the processors 1501, where the software 1511 is stored as instructions for execution by the processors 1501 to cause the computer system 1500 to operate, such as is described herein below with respect to the various Figures. Examples of computer program product and the execution of such instruction is discussed herein in more detail. The communications adapter 1507 interconnects the system bus 1502 with a network 1512, which may be an outside network, enabling the computer system 1500 to communicate with other such systems. In one embodiment, a portion of the system memory 1503 and the mass storage 1510 collectively store an operating system, which may be any appropriate operating system, such as the z/OS or AIX operating system from IBM Corporation, to coordinate the functions of the various components shown in FIG. 8.

Additional input/output devices are shown as connected to the system bus 1502 via a display adapter 1515 and an interface adapter 1516 and. In one embodiment, the adapters 1506, 1507, 1515, and 1516 may be connected to one or more I/O buses that are connected to the system bus 1502 via an intermediate bus bridge (not shown). A display 1519 (e.g., a screen or a display monitor) is connected to the system bus 1502 by a display adapter 1515, which may include a graphics controller to improve the performance of graphics intensive applications and a video controller. A keyboard 1521, a mouse 1522, a speaker 1523, etc. can be interconnected to the system bus 1502 via the interface adapter 1516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 1500 includes processing capability in the form of the processors 1501, and storage capability including the system memory 1503 and the mass storage 1510, input means such as the keyboard 1521 and the mouse 1522, and output capability including the speaker 1523 and the display 1519.

In some embodiments, the communications adapter 1507 can transmit data using any suitable interface or protocol, such as the internet small computer system interface, among others. The network 1512 may be a cellular network, a radio network, a wide area network (WAN), a local area network (LAN), or the Internet, among others. An external computing device may connect to the computer system 1500 through the network 1512. In some examples, an external computing device may be an external webserver or a cloud computing node.

It is to be understood that the block diagram of FIG. 8 is not intended to indicate that the computer system 1500 is to include all of the components shown in FIG. 8. Rather, the computer system 1500 can include any appropriate fewer or additional components not illustrated in FIG. 8 (e.g., additional memory components, embedded controllers, modules, additional network interfaces, etc.). Further, the embodiments described herein with respect to computer system 1500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processing unit, from a first tenant, a query to retrieve data from a nonrelational database system;
accessing, applying the processing unit, an index storage containing a shared index cache and a plurality of cache indexes, wherein each cache index of the plurality of cache indexes corresponds to a tenant in a plurality of tenants and the each cache index of the plurality of cache indexes further comprises an individual index specific to the corresponding tenant and a reference to the shared index cache and
determining, by the processing unit, that the index associated with the query is cached in the individual index cache that is specific to the first tenant when the index associated with the query is cached in the individual index cache;
responding to a cache penetration of the individual index cache that is specific to the first tenant by determining, by the processing unit, that the index associated with the query is cached in the shared index cache, wherein the shared index cache stores indexes for the plurality of tenants, when the index associated with the query is not cached in the individual index cache that is specific to the first tenant and the index associated with the query is cached in the shared index cache;
retrieving, by the processing unit, the result of the query based on the index in the individual index cache when the index associated with the query is stored in the individual index cache that is specific to the first tenant;
retrieving, by the processing unit, a result of the query based on the index in the shared index cache when the index associated with the query is not stored in the individual index cache that is specific to the first tenant; and
outputting, by the processing unit, the result of the query.

2. The computer-implemented method of claim 1, wherein the shared index cache is updated at a predetermined frequency.

3. The computer-implemented method of claim 1, wherein the shared index cache is updated in response to the shared index cache being full.

4. The computer-implemented method of claim 1, wherein updating the shared index cache comprises determining a first index from the shared index cache that is to be evicted.

5. The computer-implemented method of claim 4, wherein updating the shared index cache further comprises determining a second index from the index storage to replace the first index in the shared index cache.

6. The computer-implemented method of claim 1, wherein, in response to the index not being present in the shared index cache, identifying the index in the index storage, wherein the index storage has a higher latency to retrieve the index than the shared index cache.

7. A system comprising:
an index storage comprising a plurality of indexes for a nonrelational database system, the index storage containing a shared index cache and a plurality of cache indexes, wherein each cache index of the plurality of cache indexes corresponds to a tenant in a plurality of tenants and the each cache index of the plurality of cache indexes further comprises an individual index specific to the corresponding tenant and a reference to the shared index cache; and
one or more processors coupled with the index storage, the one or more processors configured to perform a method comprising:
receiving from a first tenant of the plurality of tenants, a query to retrieve data from the nonrelational database system;
accessing the index storage containing the shared index cache and the plurality of cache indexes, wherein the each cache index of the plurality of cache indexes corresponds to the tenant in the plurality of tenants and the each cache index of the plurality of cache indexes further comprises the individual index specific to the corresponding tenant and the reference to the shared index cache and
determining that the index associated with the query is cached in the individual index cache that is specific to the first tenant when the index associated with the query is cached in the individual index cache;
responding to a cache penetration of the individual index cache that is specific to the first tenant by determining that the index associated with the query is cached in the shared index cache, wherein the shared index cache stores indexes for the plurality of tenants, when the index associated with the query is not cached in the individual index cache that is specific to the first tenant and the index associated with the query is cached in the shared index cache;
retrieving the result of the query based on the index in the individual index cache when the index associated with the query is stored in the individual index cache that is specific to the first tenant;
retrieving a result of the query based on the index in the shared index cache when the index associated with the query is not stored in the individual index cache that is specific to the first tenant; and
outputting the result of the query.

8. The system of claim 7, wherein the shared index cache is updated at a predetermined frequency.

9. The system of claim 7, wherein the shared index cache is updated in response to the shared index cache being full.

10. The system of claim 7, wherein updating the shared index cache comprises determining a first index from the shared index cache that is to be evicted.

11. The system of claim 10, wherein updating the shared index cache further comprises determining a second index from the index storage to replace the first index in the shared index cache.

12. The system of claim 7, wherein, in response to the index not being present in the shared index cache, identifying the index in the index storage, wherein the index storage has a higher latency to retrieve the index than the shared index cache.

13. A computer program product comprising a computer-readable storage medium that has computer-executable instructions stored thereupon, the computer-executable instructions when executed by a processor cause the processor to perform a method comprising:
receiving from a first tenant, a query to retrieve data from a nonrelational database system;
accessing an index storage containing a shared index cache and a plurality of cache indexes, wherein each cache index of the plurality of cache indexes corresponds to a tenant in a plurality of tenants and the each cache index of the plurality of cache indexes further comprises an individual index specific to the corresponding tenant and a reference to the shared index cache and determining that the index associated with the query is cached in the individual index cache that is specific to the first tenant when the index associated with the query is cached in the individual index cache;

responding to a cache penetration of the individual index cache that is specific to the first tenant by determining that the index associated with the query is cached in the shared index cache, wherein the shared index cache stores indexes for the plurality of tenants, when the index associated with the query is not cached in the individual index cache that is specific to the first tenant and the index associated with the query is cached in the shared index cache;

retrieving the result of the query based on the index in the individual index cache when the index associated with the query is stored in the individual index cache that is specific to the first tenant;

retrieving a result of the query based on the index in the shared index cache when the index associated with the query is not stored in the individual index cache that is specific to the first tenant; and outputting the result of the query.

14. The computer program product of claim 13, wherein the shared index cache is updated at a predetermined frequency.

15. The computer program product of claim 13, wherein the shared index cache is updated in response to the shared index cache being full.

16. The computer program product of claim 13, wherein updating the shared index cache comprises determining a first index from the shared index cache that is to be evicted, and wherein updating the shared index cache further comprises determining a second index from the index storage to replace the first index in the shared index cache.

17. The computer program product of claim 13, wherein, in response to the index not being present in the shared index cache, identifying the index in the index storage, wherein the index storage has a higher latency to retrieve the index than the shared index cache.

* * * * *